US009692716B2

(12) United States Patent
Meng et al.

(10) Patent No.: US 9,692,716 B2
(45) Date of Patent: Jun. 27, 2017

(54) INTEROPERATION OF SWITCH LINE CARD AND PROGRAMMABLE LINE CARD

(71) Applicant: Hewlett Packard Enterprise Development LP, Houston, TX (US)

(72) Inventors: Dan Meng, Beijing (CN); Yunfeng Zhao, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/893,431

(22) PCT Filed: Apr. 23, 2014

(86) PCT No.: PCT/CN2014/076011

§ 371 (c)(1),
(2) Date: Nov. 23, 2015

(87) PCT Pub. No.: WO2015/000329

PCT Pub. Date: Jan. 8, 2015

(65) Prior Publication Data

US 2016/0112348 A1 Apr. 21, 2016

(30) Foreign Application Priority Data

Jul. 3, 2013 (CN) .......................... 2013 1 0278404

(51) Int. Cl.
*H04L 12/771* (2013.01)
*H04L 29/06* (2006.01)
(Continued)

(52) U.S. Cl.
CPC ...... *H04L 49/3009* (2013.01); *H04L 12/4641* (2013.01); *H04L 45/60* (2013.01);
(Continued)

(58) Field of Classification Search
CPC ..... H04L 12/4641; H04L 45/60; H04L 45/66; H04L 45/74; H04L 49/30; H04L 49/3009
(Continued)

(56) References Cited

U.S. PATENT DOCUMENTS 7,606,241 B1 * 10/2009 Raghunathan ...... H04L 41/0803 370/389
7,609,689 B1 10/2009 Desanti et al.
(Continued)

FOREIGN PATENT DOCUMENTS

CN 101296186 * 10/2008
CN 101335685 * 12/2008
(Continued)

OTHER PUBLICATIONS

"Catalyst 6500 Sup2T System QOS Architecture", Cisco, Apr. 13, 2011. http://www.cisco.com/en/US/prod/collateral/switches/ps5718/ps708/white_paper_c11-652042.pdf.
(Continued)

*Primary Examiner* — Afsar M Qureshi
(74) *Attorney, Agent, or Firm* — Hewlett Packard Enterprise Patent Department

(57) ABSTRACT

When needing to forward a packet from a switch line card to a programmable line card, the switch line card may encapsulate a pseudo-Layer 2 header for the packet based on uplink forwarding process of the switch line card. The pseudo-Layer 2 header may carry an adjacency table index and an egress interface table index which is used by the programmable line card. Correspondingly, the programmable line card may obtain the adjacency table index and the egress interface table index from the pseudo-Layer 2 header of the packet, and then may re-encapsulate a real Layer 2 header for the packet based on downlink forwarding process of the programmable line card, and transmit the packet through a corresponding egress interface.

20 Claims, 8 Drawing Sheets

(51) Int. Cl.
*H04L 12/935* (2013.01)
*H04L 12/721* (2013.01)
*H04L 12/773* (2013.01)
*H04L 12/46* (2006.01)
*H04L 12/741* (2013.01)

(52) U.S. Cl.
CPC .............. *H04L 45/66* (2013.01); *H04L 45/74* (2013.01); *H04L 49/30* (2013.01)

(58) Field of Classification Search
USPC .................................................. 370/235–389
See application file for complete search history.

(56) References Cited

U.S. PATENT DOCUMENTS 8,077,726 B1 * 12/2011 Kumar .................... H04L 45/22 370/395.31
2010/0312913 A1 12/2010 Wittenschlaeger
2011/0310736 A1 12/2011 Dighe et al.
2012/0250684 A1 * 10/2012 Ogura ................. H04L 12/4625 370/390
2013/0070645 A1 3/2013 Singh et al.
2013/0182708 A1 7/2013 Sharma et al.
2013/0287031 A1 * 10/2013 Ge ...................... H04L 67/2804 370/394
2014/0029553 A1 * 1/2014 Li ....................... H04W 72/082 370/329

FOREIGN PATENT DOCUMENTS

CN 101488862 B 7/2009
CN 101931546 12/2010
CN 102291294 12/2011
CN 103236992 B 8/2013

OTHER PUBLICATIONS

International Search Report and Written Opinion dated Jul. 28, 2014, PCT Patent Application No. PCT/CN2014/076011 dated Apr. 23, 2014, The State Intellectual Property Office, P.R. China.

* cited by examiner

711 when receiving a packet through an external interface of a switch line card, a switch chip of the switch line card may search in a FIB table of the switch chip for a corresponding FIB entry

712 when searching out the corresponding FIB entry, the switch chip of the switch line card may respectively search for a corresponding adjacency table entry and a corresponding egress interface entry in an adjacency table and an egress interface table of the switch chip; when a downlink forwarding line card is a programmable line card, the adjacency table entry and the egress interface entry searched out by the switch chip of the switch line card are respectively a pseudo-adjacency table entry and a pseudo-egress interface entry

713 when searching out the corresponding adjacency table entry and the corresponding egress interface entry, the switch chip of the switch line card may encapsulate an inter-board forwarding header and an Ethernet Layer 2 header for the packet, based on the adjacency table entry and the egress interface entry searched out, and forward the encapsulated packet to a downlink forwarding line card through a backboard

714 when receiving the packet through the backboard, a programmable chip of a programmable line card may identify type of the uplink forwarding line card, based on the inter-board forwarding header of the packet, and remove the inter-board forwarding header of the packet

715 when identifying the packet comes from the uplink switch line card, the programmable chip of the programmable line card may respectively search for a corresponding adjacency table entry and a corresponding egress interface entry in an adjacency table and an egress interface table of the programmable chip, based on the adjacency table index and the egress interface index carried in a pseudo-Layer 2 header of the packet, and remove the pseudo-Layer 2 header of the packet

716 when searching out the corresponding adjacency table entry and the corresponding egress interface entry, the programmable chip of the programmable line card may re-encapsulate a Layer 2 header of a corresponding interface type for the packet, the inter-board forwarding header and the pseudo-Layer 2 header of which have been removed, based on the adjacency table entry and the egress interface entry searched out, and transmit the encapsulated packet through a corresponding external interface of the programmable line card

FIG.6a

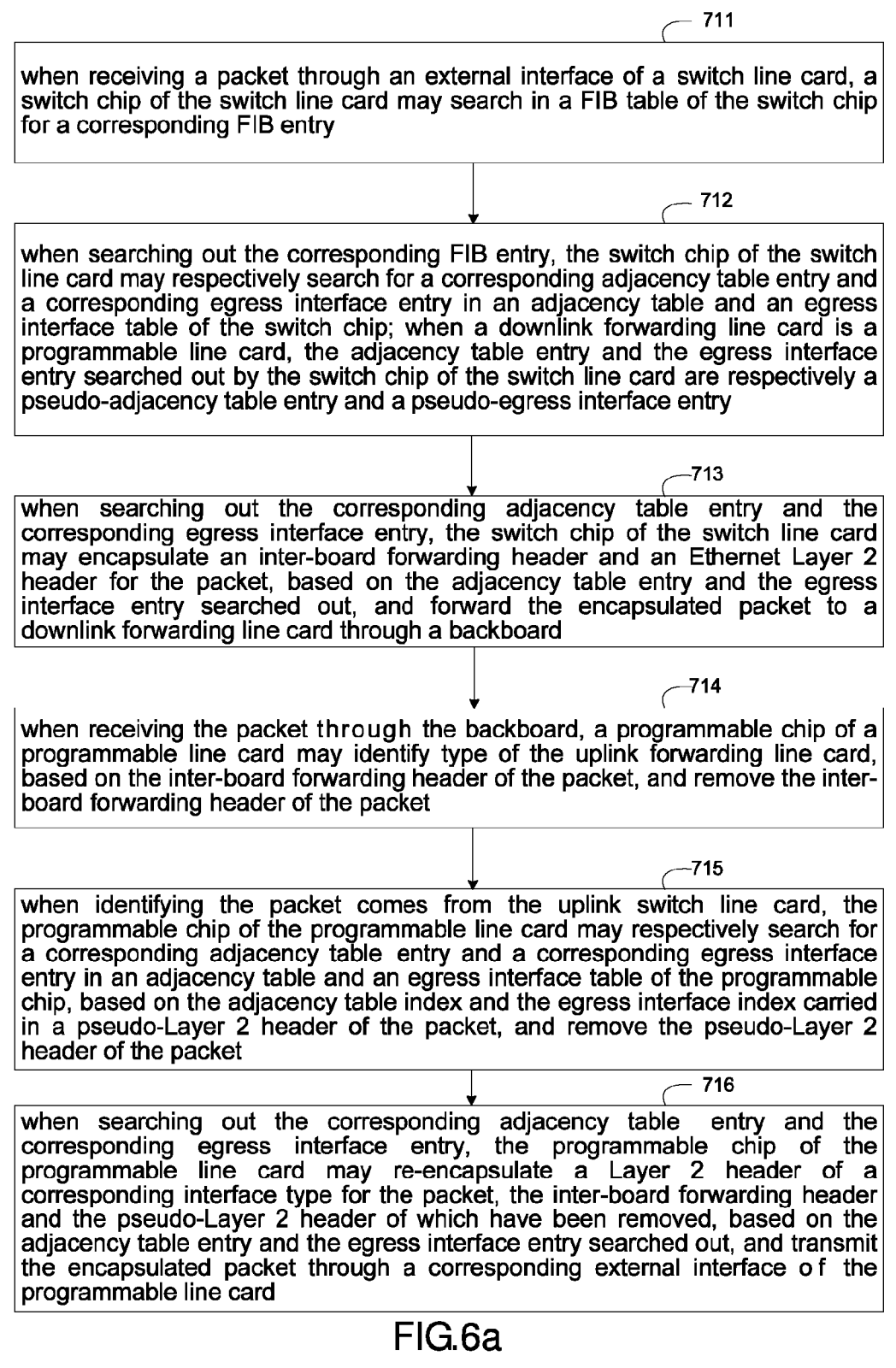

INTEROPERATION OF SWITCH LINE CARD AND PROGRAMMABLE LINE CARD

CLAIM FOR PRIORITY

The present application is a national stage filing under 35 U.S.C 371 of PCT application number PCT/CN2014/076011, having an international filing date Apr. 23, 2014 , which claims the benefit of priority from Chinese Patent Application No. 201310278404.2, having a filing date of Jul. 3, 2013, the disclosures of which are hereby incorporated by reference in their entireties.

BACKGROUND

A packet forwarding device generally includes a backboard, a main control board and a forwarding line card (referred to as a fabric board). The main control board and the forwarding line card may be plugged in the backboard.

The forwarding line card may take a switch chip as a forwarding core, or may take a programmable chip as the forwarding core. The forwarding line card taking the switch chip as the forwarding core may be referred to as a switch line card. The forwarding line card taking the programmable chip as the forwarding core may be referred to as a programmable line card.

When deploying the forwarding line card in the packet forwarding device in practice, take into account large-capacity access of the switch line card and various types of service interfaces of the programmable line card, the switch line card and the programmable line card may be generally deployed simultaneously.

BRIEF DESCRIPTION OF THE DRAWINGS

FIG. 6*a* and FIG. 6*b* are respectively a flowchart illustrating a method for interoperating between a switch line card and a programmable line card, in accordance with an example of the present disclosure.

DETAILED DESCRIPTIONS

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

In examples, interoperation of uplink and downlink may be implemented by different forwarding processes of switch line card and programmable line card. Uplink direction refers to a direction from a packet receiving side (that is, an ingress interface) to a backboard. Downlink direction refers to a direction from the backboard to a packet transmitting side (that is, an egress interface). The programmable line card may include a field-programmable gate array (FPGA) line card, a complex programmable logic device (CPLD) line card, and a network processor (NP) line card, which will not be repeated in the following. The switch line card may be one kind of an application specific integrated chip (ASIC).

First of all, descriptions about a respective forwarding process in the following cases, e.g., when the uplink and downlink forwarding line cards are both switch lines cards, and when the uplink and downlink forwarding line cards are both programmable line cards, will be given with reference to FIG. 1 and FIG. 2. Then description of the process when the uplink forwarding line card is a switch line card and the downlink forwarding line card is a programmable line card will be given with reference to FIG. 3. Then a description of the process when the uplink forwarding line card is a programmable line card and the downlink forwarding line card is a switch line card will be given with reference to FIG. 5.

Figure 1:
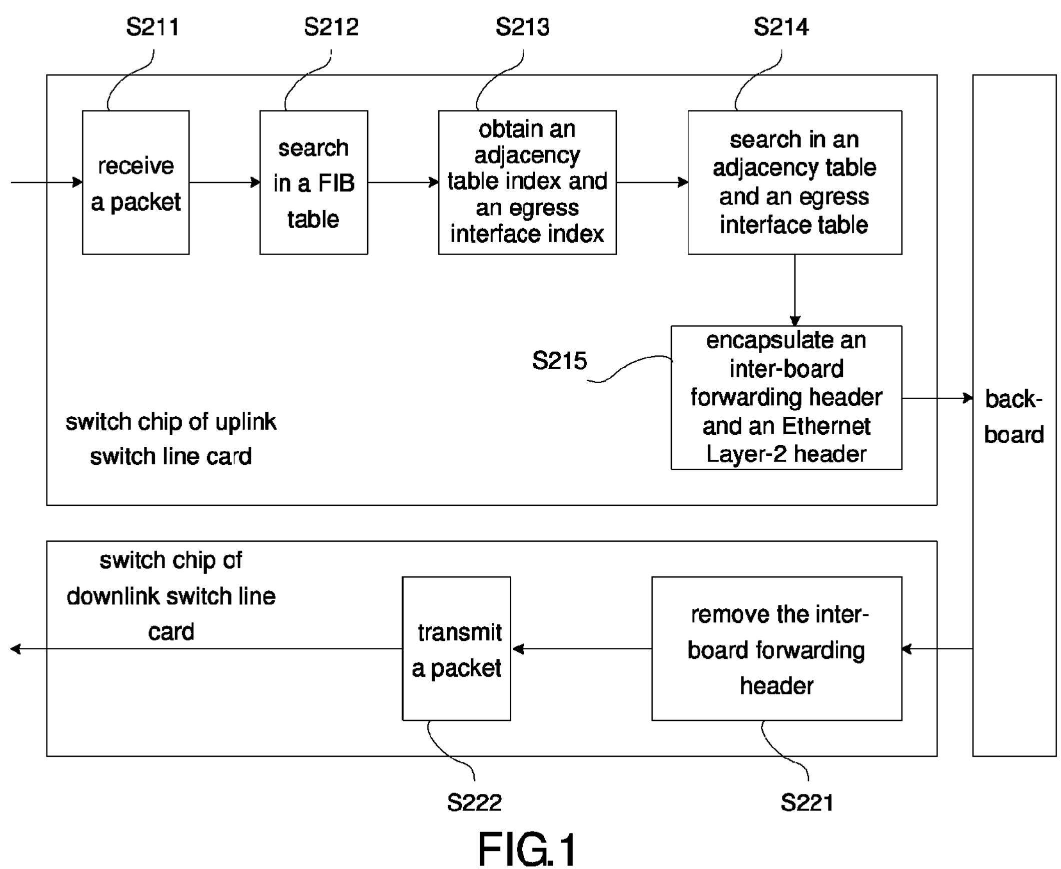
FIG. 1 is a schematic diagram illustrating a forwarding process, when uplink and downlink forwarding line cards are both switch line cards.

FIG. 1 is a schematic diagram illustrating a forwarding process, when uplink and downlink forwarding line cards are both switch line cards. As shown in FIG. 1, when forwarding a packet between the switch line cards, the following blocks may be executed.

In block S211, a switch chip of an uplink switch line card may receive a packet through an external interface of the uplink switch line card.

In block S212, the switch chip of the uplink switch line card may search for a corresponding Forward Information Base (FIB) entry in a FIB table of the switch chip.

When the corresponding FIB entry is searched out, proceed with subsequent blocks.

When no corresponding FIB entry is searched out (central processing unit (CPU) of the uplink switch line card may not configure the corresponding FIB entry in the FIB table of the switch chip, because of inadequate specification of the FIB table of the switch chip, or the corresponding FIB entry does not exist because of no corresponding route, or may be other reasons), submit the packet to the CPU of the uplink switch line card.

Subsequently, when the CPU of the uplink switch line card may search out the corresponding FIB entry in the maintained programmable FIB table, the CPU of the uplink switch line card may process the packet, and forward the packet to a CPU of a downlink forwarding line card (which may be the downlink switch line card in the process) through the backboard. However, when the corresponding FIB entry does not exist in the CPU of the uplink switch line card (the corresponding FIB entry may not exist because of no corresponding route), discard the packet.

In block S213, the switch chip of the uplink switch line card may obtain a corresponding adjacency table index and a corresponding egress interface index from the FIB entry searched out.

In block S214, the switch chip of the uplink switch line card may respectively search for a corresponding adjacency table entry and a corresponding egress interface entry in an adjacency table, and an egress interface table, such as a virtual local area network (VLAN) virtual interface table, of the switch chip, based on the obtained adjacency table index and egress interface index.

In block S215, based on the adjacency table entry and egress interface entry searched out, the switch chip of the uplink switch line card may encapsulate any kind of inter-board forwarding header, such as HIGIG header, and an Ethernet Layer 2 header for the packet, and forward the packet encapsulated with the inter-board forwarding header and the Ethernet Layer 2 header to the backboard.

The inter-board forwarding header may carry a source module (SMOD) indicating a slot located by the uplink switch line card, a destination module (DMOD) indicating a slot located by the downlink forwarding line card, and a destination port (DPORT) indicating a corresponding egress interface of the packet of the downlink forwarding line card. The DMOD and DPORT may be determined based on the adjacency table entry.

The Ethernet Layer 2 header may include a destination media access control (DMAC), a source media access control (SMAC), and a VLAN identifier (VLAN ID). The DMAC may be determined based on the adjacency table entry. The SMAC and the VLAN ID may be determined based on the egress interface entry.

Subsequently, based on the DMOD carried by the inter-board forwarding header of the packet, the backboard may forward the packet to the downlink switch line card.

Since the downlink forwarding line card is the switch line card, the adjacency table entry may include a DMOD indicating the slot located by the downlink forwarding line card, a DPORT indicating a corresponding egress interface of the packet of the downlink forwarding line card, as well as a DMAC in an Ethernet Layer 2 header used for forwarding. The egress interface entry may include a VLAN ID and a source MAC of an Ethernet Layer 2 header used for forwarding.

In block S221, the switch chip of the downlink switch line card may receive the packet from the uplink switch line card through the backboard, obtain the DPORT from the inter-board forwarding header of the packet, and remove the inter-board forwarding header of the packet.

In block S222, since the DPORT carried by the inter-board forwarding header may indicate a corresponding egress interface of the packet of the downlink switch line card, the switch chip of the downlink switch line card may transmit the packet with the Ethernet Layer 2 header through a corresponding external interface of the downlink switch line card, based on the egress interface indicated by the obtained DPORT.

Since the Layer 2 encapsulation implemented by the switch chip is generally limited to a single Ethernet encapsulation (length of the encapsulated Layer 2 header is 18 bytes), when forwarding a packet between switch line cards with the forwarding process shown in FIG. 1, the Layer 2 encapsulation of the packet may be implemented by the switch chip of the uplink switch line card. The switch chip of the uplink switch line card may enable the inter-board forwarding header to carry the DPORT indicating a corresponding egress interface of the packet of the downlink forwarding line card. The switch chip of the downlink switch line card may forward the packet based on the DPORT in the inter-board forwarding header, without performing the Layer 2 encapsulation on the packet.

Figure 2:
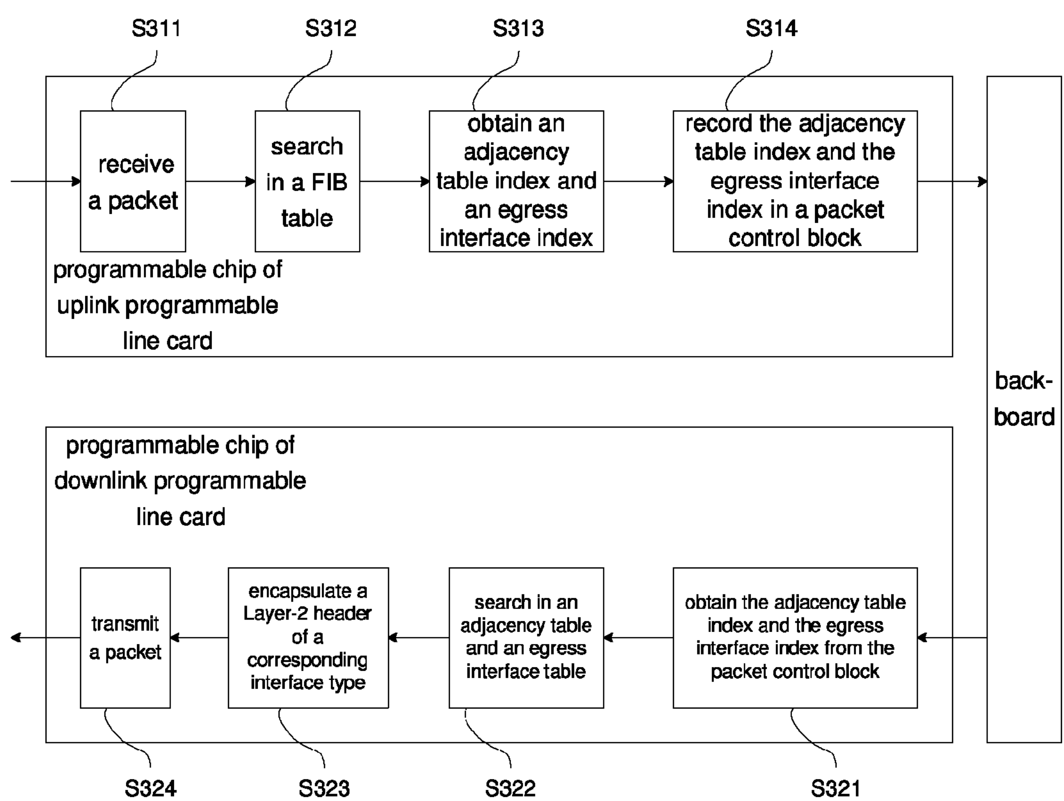
FIG. 2 is a schematic diagram illustrating a forwarding process, when uplink and downlink forwarding line cards are both programmable line cards.

FIG. 2 is a schematic diagram illustrating a forwarding process, when uplink and downlink forwarding line cards are both programmable line cards. As shown in FIG. 2, when forwarding a packet between the programmable line cards, the following blocks may be executed.

In block S311, a programmable chip of an uplink programmable line card may receive a packet through an external interface of the uplink programmable line card. The programmable chip may include an FPGA chip, a CPLD and an NP, which will not be repeated in the following.

In block S312, the programmable chip of the uplink programmable line card may search for a corresponding FIB entry in a FIB table of the programmable chip.

When the corresponding FIB entry is searched out, proceed with subsequent blocks.

When no corresponding FIB entry is searched out (because of inadequate specification of the FIB table of the programmable chip, the uplink programmable line card may not configure the corresponding FIB entry in the programmable chip, or since there is no corresponding route, the corresponding FIB entry does not exist, or other reasons), submit the packet to the CPU of the uplink programmable line card.

When the corresponding FIB entry is searched out by the CPU of the uplink programmable line card in the programmable FIB table maintained by the CPU, the CPU of the uplink programmable line card may process the packet, and forward the packet to the CPU of the downlink forwarding line card (which may be the downlink programmable line card in the process) through the backboard. When the corresponding FIB entry does not exist in the CPU of the uplink programmable line card (since there is no corresponding route, the corresponding FIB entry does not exist), discard the packet.

In block S313, the programmable chip of the uplink programmable line card may obtain an adjacency table index and an egress interface index from the FIB entry searched out, and identify whether the downlink forwarding line card is a programmable line card or a switch line card.

The CPU of the uplink programmable line card may configure in advance a corresponding relationship between an egress interface index and a DMOD in the programmable chip, and configure type of the forwarding line card corresponding to each DMOD. Correspondingly, after searching out the corresponding FIB entry, the programmable chip may identify the DMOD corresponding to the obtained egress interface index, based on the corresponding relationship between the egress interface index and the DMOD, and may identify the type of the downlink forwarding line card, based on the corresponding relationship between the DMOD and the line card type.

In block S314, when the programmable chip of the uplink programmable line card identifies that the downlink forwarding line card is a programmable line card, since the downlink programmable line card is in charge of searching for the adjacency table entry and the egress interface entry, as well as encapsulation of the Ethernet Layer 2 header, the programmable chip of the uplink programmable line card may encapsulate an inter-board forwarding header (such as the HIGIG header) and a packet control block for the packet, and forward the packet with the inter-board forwarding header and the packet control block to the backboard.

The inter-board forwarding header may carry the SMOD indicating the slot located by the uplink programmable line card, the DMOD indicating the slot located by the downlink forwarding line card. The DMOD may be determined based on the corresponding relationship between the egress interface index and the DMOD, which is configured by the CPU in the programmable chip.

The packet control block may include the adjacency table index and the egress interface index, which are obtained by the programmable chip of the uplink programmable line card.

Subsequently, based on the DMOD in the inter-board forwarding header of the packet, the backboard may forward the packet to the downlink programmable line card.

In block S321, the programmable chip of the downlink programmable line card may receive the packet from the uplink programmable line card through the backboard, and identify the type of the uplink forwarding line card of the packet, based on the SMOD in the inter-board forwarding header of the packet. In the process, the identified downlink forwarding line card is the programmable line card. Subsequently, after removing the inter-board forwarding header of the packet, the programmable chip of the downlink programmable line card may obtain the adjacency table index and the egress interface index from the packet control block of the packet.

In block S322, the programmable chip of the downlink programmable line card may respectively search out the corresponding adjacency table entry and the corresponding egress interface entry in the adjacency table and egress interface table of the programmable chip, based on the obtained adjacency table index and the egress interface index.

In block S323, the programmable chip of the downlink programmable line card may encapsulate a Layer 2 header of a corresponding interface type (the corresponding interface type may be determined in advance) for the packet, based on the adjacency table entry and egress interface entry searched out.

In block S324, the programmable chip of the downlink programmable line card may transmit the packet encapsulated with the Layer 2 header of the corresponding interface type through a corresponding external interface of the downlink programmable line card, based on an egress interface indicated by the DMAC in the adjacency table entry searched out.

Since the programmable line card may provide various interface types, in addition to providing an Ethernet interface, the programmable line card may also provide various interface types commonly used in a wide area network (WAN), such as a packet over synchronous optical network (SONET)/synchronous digital hierarchy (SDH) (POS) interface, a Layer 3 aggregate interface, a high-level data link control (HDLC) bundle interface, and a tunnel interface. Thus, when forwarding a packet between programmable line cards based on the forwarding process shown in FIG. 2, the programmable chip of the downlink programmable line card located by the egress interface may be in charge of the Layer 2 encapsulation of the packet, and searching for the egress interface. The programmable chip of the uplink programmable line card may provide the adjacency table index and the egress interface index, which are used for executing the Layer 2 encapsulation.

Descriptions about forwarding processes in two cases, that is, the uplink and downlink forwarding line cards are respectively a switch line card and a programmable line card, as well as, the uplink and downlink forwarding line cards are respectively a programmable line card and a switch line card, will be respectively provided in the following.

When the uplink and downlink forwarding line cards are respectively the switch line card and the programmable line card, take into account that the forwarding process of the switch chip may be fixed, regarding the switch chip of the uplink switch line card, the process of encapsulating the inter-board forwarding header and the Ethernet Layer 2 header is still reserved in the example.

However, the uplink forwarding line card may provide the adjacency table index and the egress interface index for the downlink programmable line card.

Subsequently, requirements for providing the adjacency table index and the egress interface index by the switch chip of the uplink switch line card for the downlink programmable line card may occur, and repeated encapsulation of Layer 2 header may also occur.

To meet the requirements for providing the adjacency table index and the egress interface index by the switch chip of the uplink switch line card for the downlink programmable line card, and avoid repeated encapsulation of the Layer 2 header, in the example, the adjacency table entry and egress interface entry used by the switch chip of the uplink switch line card when encapsulating the Ethernet Layer 2 header are not real entries used for the Ethernet encapsulation for forwarding, but are instead a pseudo-adjacency table entry and pseudo-egress interface entry respectively configured by the CPU of the uplink switch chip in the adjacency table and the egress interface table of the switch chip of the uplink switch line card. A pseudo-adjacency table entry is a false entry in that it is not used for Ethernet encapsulation forwarding, but rather contain information which is used by the downlink programmable line card to search for a corresponding adjacency table entry. A pseudo-egress interface entry is a false entry in that it is not used for Ethernet encapsulation forwarding, but include a VLAN ID and a MAC which are used for transmission from uplink to downlink.

The pseudo-adjacency table entry may include the adjacency table index and the egress interface index needed by the downlink programmable line card. The pseudo-egress interface entry may include a universal VLAN ID and a universal source MAC, which are dedicated for the uplink switch line card to forward a packet to the downlink programmable line card. The universal VLAN ID and the universal source MAC may also be considered as false VLAN ID and false source MAC, and may be respectively implemented by the VLAN ID and the source MAC of the reserved VLAN resources.

Correspondingly, when forwarding a packet from the uplink switch line card to the downlink programmable line card, the switch chip of the uplink switch line card may obtain the Ethernet Layer 2 header, based on the pseudo-adjacency table entry and the pseudo-egress interface entry. At this time, although format of the Layer 2 header is still format of the Ethernet Layer 2 header, the Layer 2 header encapsulated with the pseudo-adjacency table entry and the pseudo-egress interface entry is not a real Ethernet Layer 2 header used for forwarding, which is a pseudo-Layer 2 header carrying the adjacency table index and the egress interface index needed by the downlink programmable line card.

The adjacency table index and egress interface index in the pseudo-adjacency table entry, which are needed by the downlink programmable line card, are encapsulated into the destination MAC field of the pseudo-Layer 2 header. The pseudo-egress interface entry may include the universal VLAN ID and the universal source MAC, which are dedicated for the switch line card to forward a packet to the programmable line card. The universal VLAN ID and the universal source MAC are respectively encapsulated into the VLAN ID field and the source MAC field of the pseudo-Layer 2 header.

The establishing and configuration modes for the pseudo-adjacency table entry and the pseudo-egress interface entry are the same as that for the real adjacency table entry and the real egress interface entry.

In addition, the programmable chip of the downlink programmable line card may determine whether the uplink forwarding line card transmitting the packet is the programmable line card or the switch line card, based on the SMOD in the inter-board forwarding header.

When determining that the uplink forwarding line card is the programmable line card, the programmable chip of the downlink programmable line card may obtain needed adjacency table index and egress interface index from the packet control block, based on block S321 in the process shown in FIG. 2.

When determining that the packet is forwarded by the switch line card, the programmable chip of the downlink programmable line card may obtain needed adjacency table index and egress interface index from the Ethernet Layer 2 header of the packet, that is, the pseudo-Layer 2 header, so as to search out the real adjacency table entry and the real egress interface entry used for encapsulation based on the obtained adjacency table index and egress interface index, remove the pseudo-Layer 2 header of the packet, and re-perform a Layer 2 encapsulation of a corresponding interface type on the packet, based on the adjacency table entry and egress interface entry searched out in the downlink programmable line card.

Thus, based on the pseudo-Layer 2 header of the packet, requirements for providing the adjacency table index and the egress interface index by the switch chip of the uplink switch line card for the downlink programmable line card may be met, and repeated encapsulation of the Layer 2 header may also be avoided.

When the uplink and downlink forwarding line cards are respectively the programmable line card and the switch line card, first of all, the programmable chip of the uplink programmable line card needs the adjacency table entry and the egress interface entry of the downlink switch line card. The adjacency table entry and egress interface entry in the uplink programmable line card used for Layer 2 encapsulation may be obtained, after synchronizing the CPU of the uplink programmable line card with the CPU of the downlink switch line card.

When the programmable chip of the uplink programmable line card determines that the downlink forwarding line card is the switch line card, based on block S313 in the process shown in FIG. 2, the programmable chip of the uplink programmable line card may respectively search for the corresponding adjacency table entry and the corresponding egress interface entry in the adjacency table and egress interface table of the programmable chip, and perform the Ethernet Layer 2 encapsulation on the packet, based on modes same as blocks S214~S215 in the process shown in FIG. 1.

Detailed descriptions about the example will be provided in the following accompanying with specific forwarding process.

Figure 3:
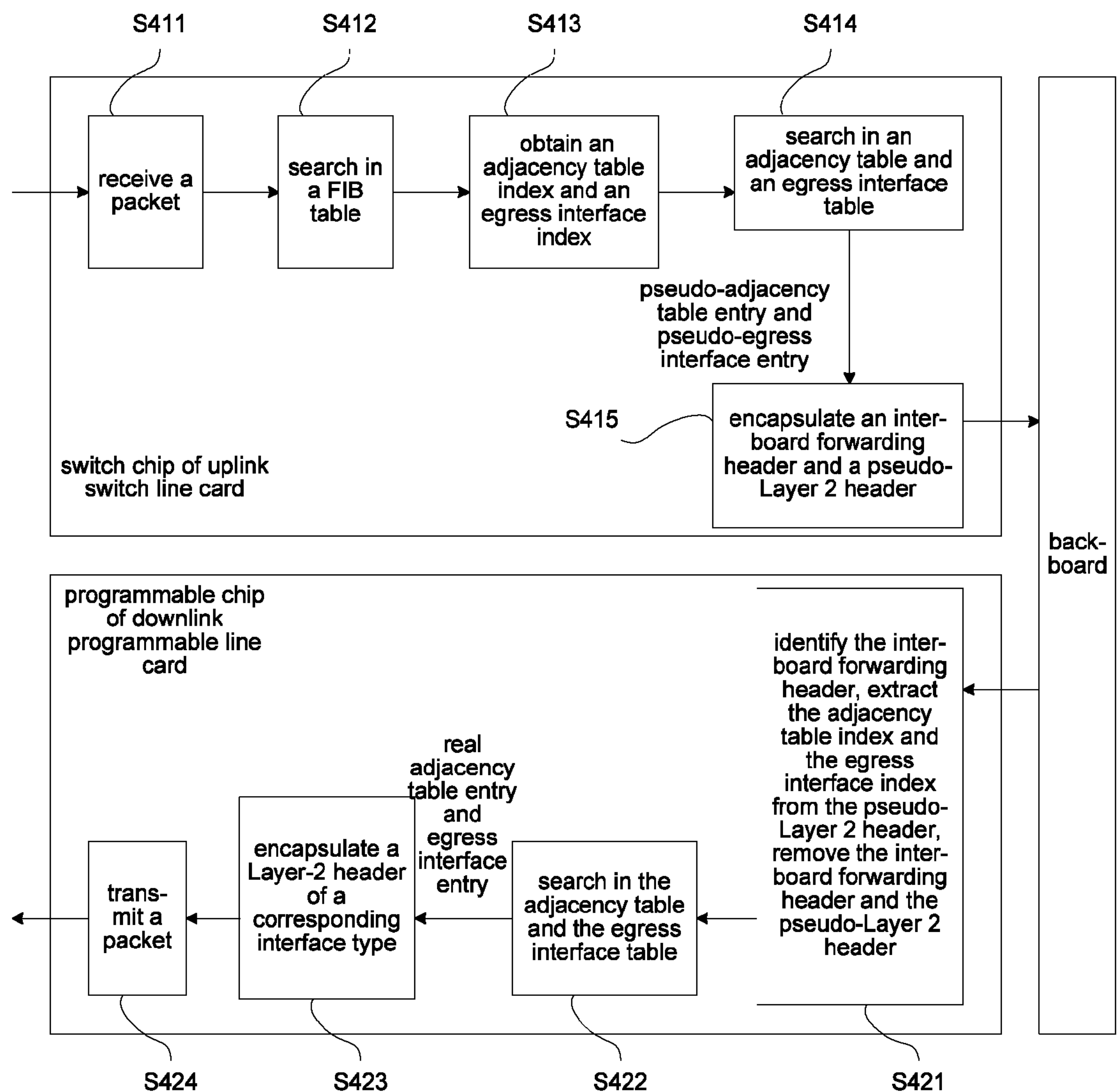
FIG. 3 is a schematic diagram illustrating a forwarding process, when uplink and downlink forwarding line cards are respectively a switch line card and a programmable line card, in accordance with an example of the present disclosure.

FIG. 3 is a schematic diagram illustrating a forwarding process, when uplink and downlink forwarding line cards are respectively a switch line card and a programmable line card, in accordance with an example of the present disclosure. As shown in FIG. 3, when the uplink switch line card and the downlink programmable line card communicates with each other, the following blocks may be executed.

In block S411, a switch chip of an uplink switch line card may receive a packet through an external interface of the uplink switch line card.

In block S412, the switch chip of the uplink switch line card may search for a corresponding FIB entry in a FIB table of the switch chip.

When the corresponding FIB entry is searched out, proceed with subsequent blocks.

When no corresponding FIB entry is searched out (the CPU of the uplink switch line card may not configure the corresponding FIB entry in the FIB table of the switch chip, because of inadequate specification of the FIB table of the switch chip, or no corresponding FIB entry exists since there is no corresponding route, or may be other reasons), submit the packet to the CPU of the uplink switch line card.

And then, when the CPU of the uplink switch line card may search out the corresponding FIB entry in the maintained programmable FIB table, the CPU of the uplink switch line card may process the packet, and forward the packet from the switch chip to the CPU of the downlink programmable line card through the backboard. When the corresponding FIB entry does not exist in the CPU of the uplink switch line card (the corresponding FIB entry may not exist because of no corresponding route), discard the packet.

In block S413, the switch chip of the uplink switch line card may obtain a corresponding adjacency table index and a corresponding egress interface index from the FIB entry searched out.

In block S414, the switch chip of the uplink switch line card may respectively search for the corresponding adjacency table entry and the corresponding egress interface entry in the adjacency table and egress interface table, such as a VLAN virtual interface table, of the switch chip, based on the obtained adjacency table index and egress interface index.

The downlink forwarding line card in the process is the programmable line card. Thus, the adjacency table entry and the egress interface entry searched out by the switch chip of the uplink switch line card is the pseudo-adjacency table entry and the pseudo-egress interface entry, which is different from that searched out in block S214. In block S214, the real adjacency table entry and the real egress interface entry may be searched out.

In block S415, the switch chip of the uplink switch line card may encapsulate an inter-board forwarding header (e.g., the HIGIG header), and a pseudo-Layer 2 header for the packet, based on the pseudo-adjacency table entry and the pseudo-egress interface entry searched out, and forward the packet encapsulated with the inter-board forwarding header and the pseudo-Layer 2 header to the backboard.

Figure 4:
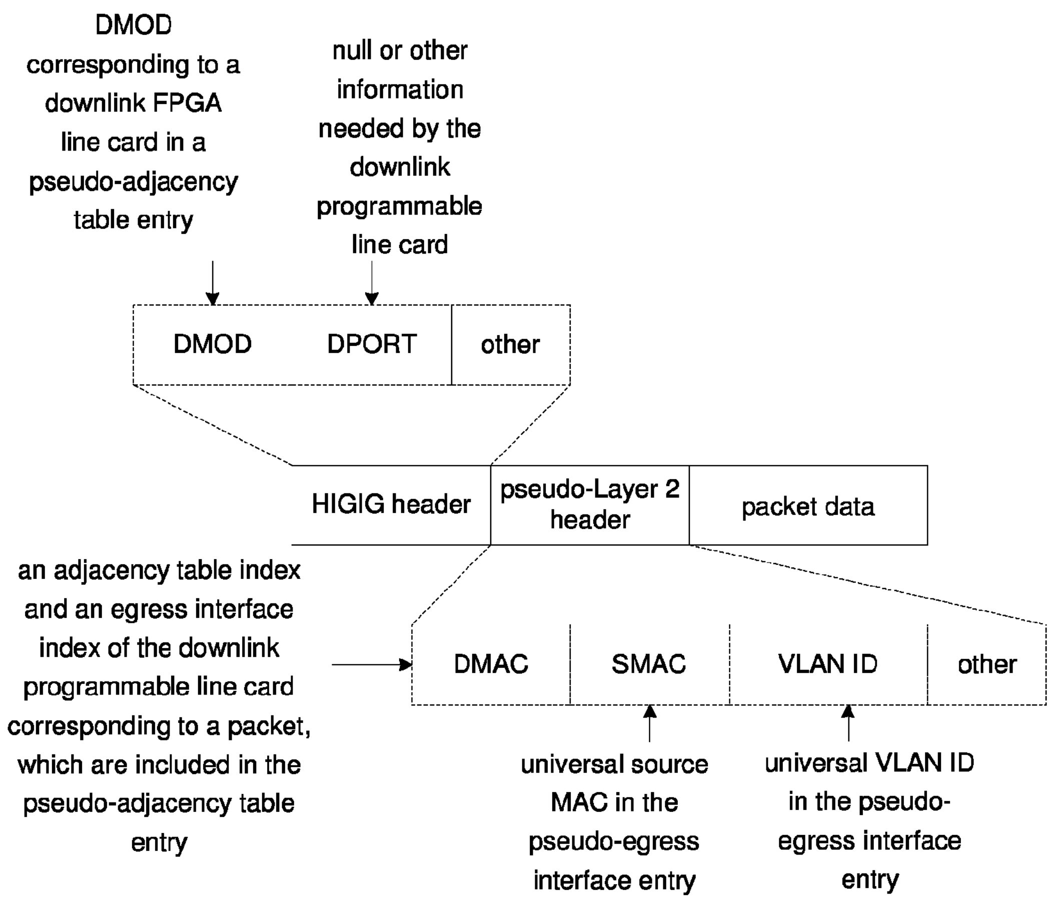
FIG. 4 is a schematic diagram illustrating a packet format, which is encapsulated by an uplink switch line card in the forwarding process shown in FIG. 3.

Combining FIG. 3 with FIG. 4, when the inter-board forwarding header is the HIGIG header, the HIGIG header may include a DMOD field, a DPORT field and other fields, such as SMOD.

The DMOD field may carry the DMOD indicating the slot located by the downlink forwarding line card. The DMOD may be determined by the pseudo-adjacency table entry. The DPORT field may be empty, or may carry other information used for function extension. The SMOD field may carry the SMOD indicating the slot located by the uplink switch line card.

Combining FIG. 3 with FIG. 4, when the egress interface entry is the VLAN virtual interface entry, the pseudo-Layer 2 header possessing the same format as the real Ethernet Layer 2 header may still include the DMAC filed, the SMAC field, the VLAN ID field, as well as other fields.

The DMAC field in the pseudo-Layer 2 header may carry the adjacency table index and the egress interface index needed by the downlink programmable line card, instead of carrying the real DMAC. Correspondingly, the DMAC originally included in the pseudo-adjacency table entry actually be replaced with the adjacency table index and egress interface index needed by the downlink programmable line card. The SMAC field and VLAN ID field may respectively carry the SMAC and VLAN ID in the reserved VLAN resources, which are dedicated for the uplink switch line card to forward a packet to the downlink programmable line card, instead of respectively carrying the real SMAC and real VLAN ID. That is, the SMAC and VLAN ID in the reserved VLAN resources may be respectively taken as universal SMAC and universal VLAN ID, and respectively written into the SMAC field and VLAN ID field of all the packets, which are forwarded by the switch line card to the programmable line card. Correspondingly, the pseudo-egress interface entry may be implemented by using the reserved VLAN virtual interface entry 4095.

And then, based on the DMOD carried by the inter-board forwarding header of the packet, the backboard may forward the packet to the downlink programmable line card.

In block S421, the programmable chip of the downlink programmable line card may receive the packet from the uplink switch line card through the backboard, and identify the type of the uplink forwarding line card, based on the SMOD in the inter-board forwarding header of the packet. In the process, the identified uplink forwarding line card is the switch line card. Thus, after removing the inter-board forwarding header, obtain the adjacency table index and the egress interface index from the Ethernet Layer 2 header of the packet, that is, the pseudo-Layer 2 header (in other words, the DMAC field of the pseudo-Layer 2 header) of the packet.

In block S422, the programmable chip of the downlink programmable line card may respectively search out the corresponding adjacency table entry and corresponding egress interface entry in the adjacency table and egress interface table of the programmable chip, based on the obtained adjacency table index and egress interface index.

In block S423, the programmable chip of the downlink programmable line card may re-perform the Layer 2 encapsulation on the packet, based on a Layer 2 header of a corresponding interface type, as well as the adjacency table entry and the egress interface entry searched out.

In block S424, the programmable chip of the downlink programmable line card may transmit the packet encapsulated with the Layer 2 header of the corresponding interface type through a corresponding external interface of the downlink programmable line card, based on the egress interface indicated by the DMAC in the adjacency table entry searched out.

Based on the foregoing descriptions, it can be seen that, although the switch chip of the uplink switch line card may still perform the Ethernet Layer 2 encapsulation on the packet, when the uplink switch line card communicates with the downlink programmable line card, functions of the Ethernet Layer 2 encapsulation performed by the uplink switch line card on the packet are to encapsulate the pseudo-Layer 2 header for the packet, instead of forming the real Ethernet Layer 2 header used for forwarding, and to deliver necessary adjacency table index and egress interface index to the downlink programmable line card by using the pseudo-Layer 2 header. Subsequently, the downlink programmable line card may be enabled to perform the correct Layer 2 encapsulation on the packet, based on the delivered adjacency table index and egress interface index.

Figure 5:
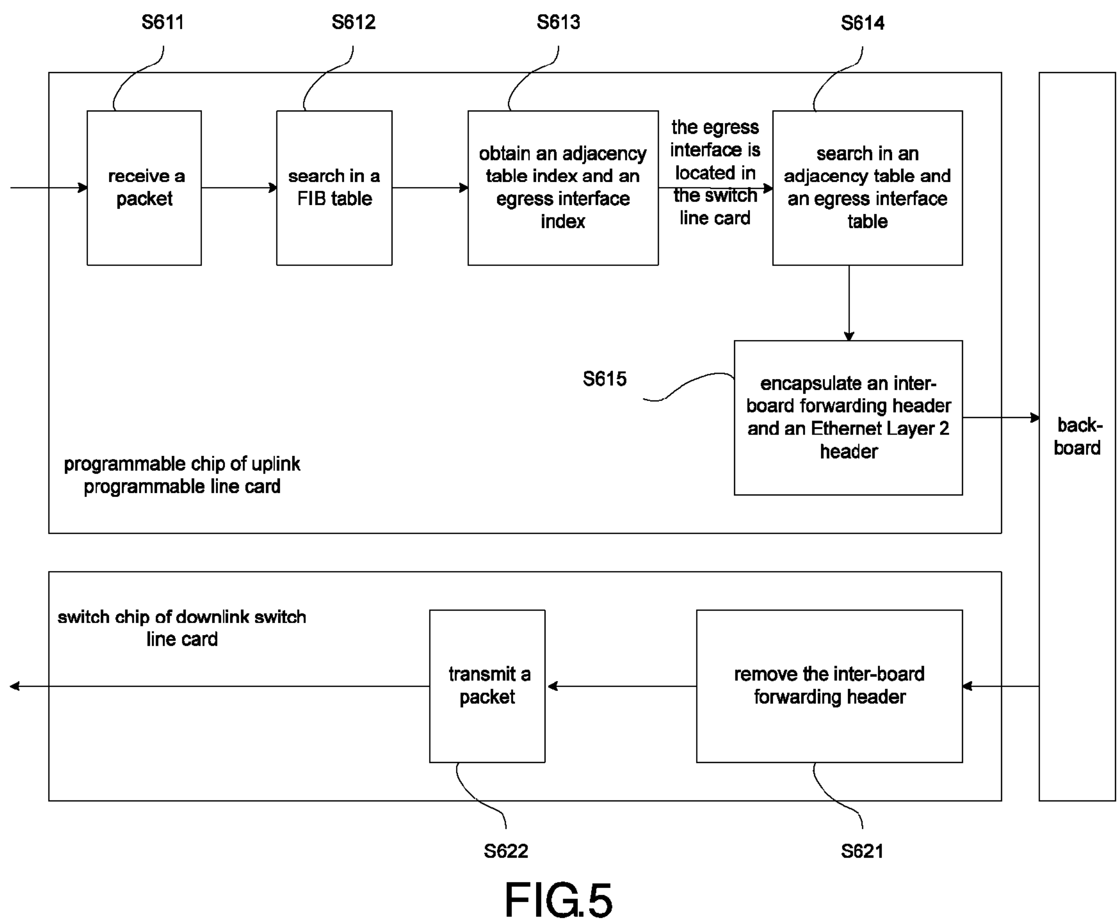
FIG. 5 is a schematic diagram illustrating a forwarding process, when uplink and downlink forwarding line cards are respectively a programmable line card and a switch line card, in accordance with an example of the present disclosure.

FIG. 5 is a schematic diagram illustrating a forwarding process, when uplink and downlink forwarding line cards are respectively a programmable line card and a switch line card, in accordance with an example of the present disclosure. As shown in FIG. 5, when the uplink programmable line card and the downlink switch line card communicates with each other, the following blocks may be executed.

In block S611, a programmable chip of the uplink programmable line card may receive a packet through an external interface of the uplink programmable line card.

In block S612, the programmable chip of the uplink programmable line card may search for a corresponding FIB entry in a FIB table of the programmable chip.

When the corresponding FIB entry is searched out, proceed with subsequent blocks.

When no corresponding FIB entry is searched out (the uplink programmable line card may not configure the corresponding FIB entry in the programmable chip, because of inadequate specification of the FIB table of the programmable chip, or the corresponding FIB entry does not exist because there is no corresponding route, or may be other reasons), submit the packet to the CPU of the uplink programmable line card.

Subsequently, when the CPU of the uplink programmable line card may search out the corresponding FIB entry in the maintained programmable FIB table, the CPU of the uplink programmable line card may process the packet, and then forward the packet from the programmable chip to the CPU of the downlink switch line card through the backboard. When the corresponding FIB entry does not exist in the CPU of the uplink programmable line card (the corresponding FIB entry may not exist because there is no corresponding route), discard the packet.

In block S613, the programmable chip of the uplink programmable line card may obtain an adjacency table index and an egress interface index from the FIB entry searched out, and identify whether the downlink forwarding line card is the programmable line card or the switch line card.

The CPU of the uplink programmable line card may configure in advance a corresponding relationship between an egress interface index and a DMOD in the programmable chip, and configure a forwarding line card type corresponding to each DMOD. Correspondingly, after searching out the corresponding FIB entry, the programmable chip may identify the DMOD corresponding to the obtained egress interface index, based on the corresponding relationship between the egress interface index and the DMOD, and identify the type of the downlink forwarding line card, based on the corresponding relationship between the DMOD and the line card type.

In block S614, when the programmable chip of the uplink programmable line card identifies that the downlink forwarding line card is the switch line card, the programmable chip of the uplink programmable line card may respectively search out the adjacency table entry and the egress interface entry used for the Ethernet Layer 2 encapsulation in the adjacency table and egress interface table of the programmable chip, based on the adjacency table index and the egress interface index searched out.

In block S615, the programmable chip of the uplink programmable line card may encapsulate an inter-board forwarding header (such as the HIGIG header) and an Ethernet Layer 2 header for the packet, based on the adjacency table entry and the egress interface entry searched out, and forward the packet encapsulated with the inter-board forwarding header and the Ethernet Layer 2 header to the backboard.

The inter-board forwarding header may carry a SMOD indicating the slot located by the uplink programmable line card, a DMOD indicating the slot located by the downlink forwarding line card, and a DPORT indicating the egress interface corresponding to the downlink forwarding line card of the packet. The DMOD and DPORT may be determined based on the adjacency table entry.

The Ethernet Layer 2 header may include a DMAC, a SMAC and a VLAN ID. The DMAC may be determined based on the adjacency table entry. The SMAC and the VLAN ID may be determined based on the egress interface entry.

And then, based on the DMOD carried by the inter-board forwarding header of the packet, the backboard may forward the packet to the downlink switch line card.

In block S621, the switch chip of the downlink switch line card may receive the packet from the uplink programmable line card through the backboard, obtain the DPORT from the inter-board forwarding header of the packet, and remove the inter-board forwarding header of the packet.

In block S622, since the DPORT carried by the inter-board forwarding header may indicate the corresponding egress interface of the packet in the downlink switch line card, the switch chip of the downlink switch line card may transmit the packet with the Ethernet Layer 2 header through a corresponding external interface of the downlink switch line card, based on the egress interface indicated by the obtained DPORT.

Based on the foregoing descriptions, it can be seen that, the programmable chip of the uplink programmable line card may encapsulate the Ethernet Layer 2 header for the packet, based on the encapsulation process of the uplink switch line card, such that the downlink switch line card may continuously forward the packet based on original process.

Detailed descriptions about interoperation between switch line card and programmable line card in the example are provided with the foregoing contents. Based on the foregoing principle, an example of the present disclosure provides a method for interoperating between a switch line card and a programmable line card.

Figure 6B:
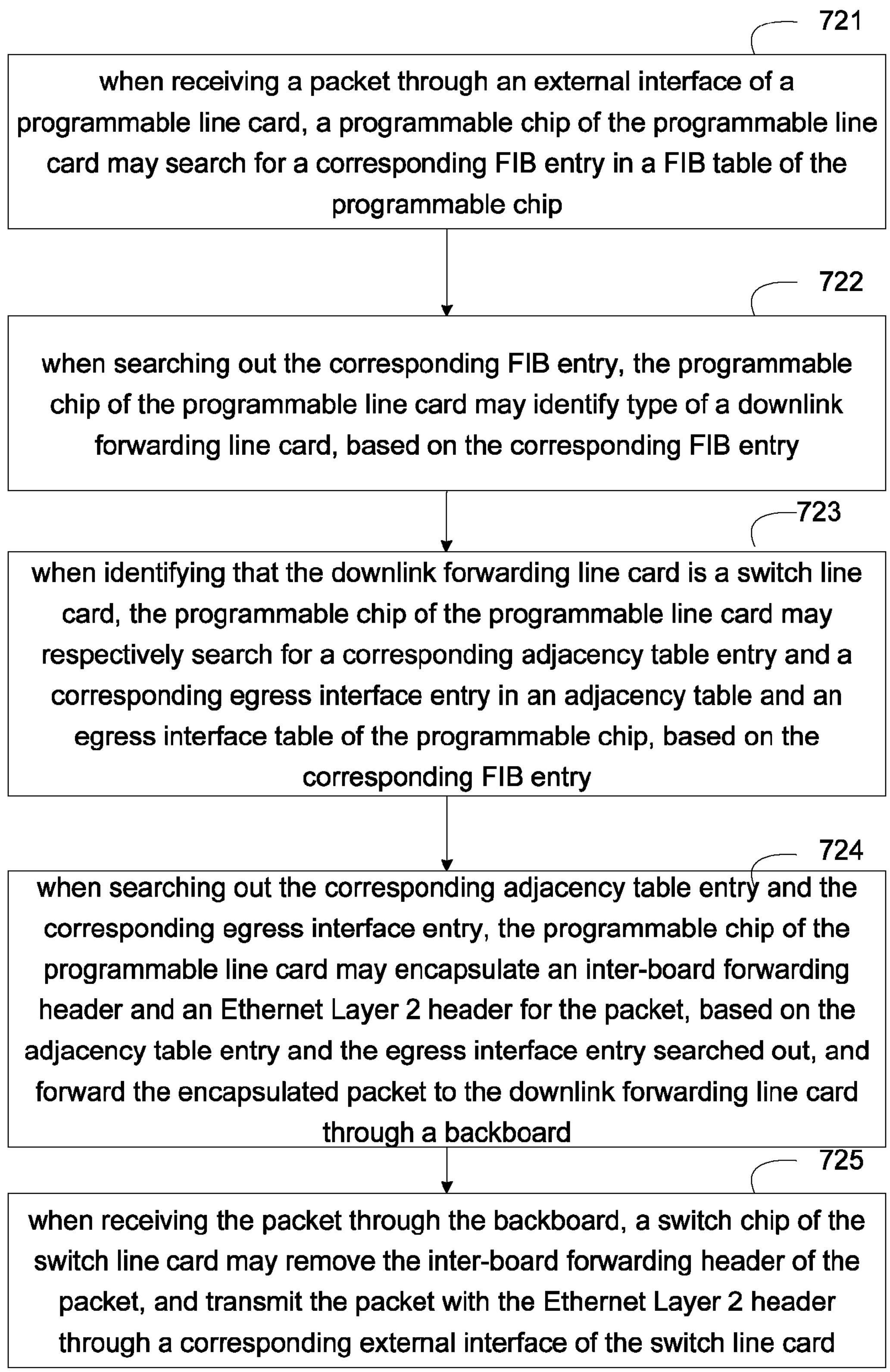

FIG. 6*a* and FIG. 6*b* are respectively a flowchart illustrating a method for interoperating between a switch line card and a programmable line card, in accordance with an example of the present disclosure.

As shown in FIG. 6*a*, the following blocks may be included in the method for interoperating between an uplink switch line card and a downlink programmable line card.

In block 711, when a switch chip of the switch line card receives a packet through an external interface of the switch line card, the switch chip may search for a corresponding FIB entry in a FIB table of the switch chip.

In block 712, when the switch chip of the switch line card searches out the corresponding FIB entry, the switch chip may respectively search for a corresponding adjacency table entry and a corresponding egress interface entry in an adjacency table and an egress interface table of the switch chip, based on the corresponding FIB entry.

When the downlink forwarding line card is the programmable line card, the adjacency table entry and egress interface entry searched out by the switch chip of the switch line card are respectively a pseudo-adjacency table entry and a pseudo-egress interface entry. The pseudo-adjacency table entry may include an adjacency table index and an egress interface index needed by the downlink programmable line card. The pseudo-egress interface entry may include a universal VLAN ID and a universal source MAC, which are dedicated for a switch line card to forward a packet to a programmable line card.

In block 713, the switch chip may encapsulate an inter-board forwarding header and an Ethernet Layer 2 header for the packet, based on the adjacency table entry and the egress interface entry searched out, and forward the encapsulated packet to the downlink forwarding line card through the backboard.

When the downlink forwarding line card is the programmable line card, the Ethernet Layer 2 header encapsulated for the packet based on the pseudo-adjacency table entry and the pseudo-egress interface entry may be a pseudo-Layer 2 header, which carries the adjacency table index and the egress interface index needed by the downlink programmable line card, as well as carries the universal VLAN ID and the universal source MAC.

For example, the pseudo-adjacency table entry may include the adjacency table index and the egress interface index needed by the downlink programmable line card, which are encapsulated into the destination MAC field of the pseudo-Layer 2 header. The pseudo-egress interface entry may include the universal VLAN ID and the universal source MAC (e.g., the VLAN ID and source MAC in the reserved VLAN resources) dedicated for the switch line card to forward a packet to the programmable line card, which are respectively encapsulated into the VLAN ID field and the source MAC field in the pseudo-Layer 2 header.

In block 714, when the programmable chip of the programmable line card receives the packet from the backboard, the programmable chip may identify the type of the uplink forwarding line card, based on the inter-board forwarding header of the packet, and remove the inter-board forwarding header of the packet.

For example, the inter-board forwarding header may carry the SMOD indicating the slot located by the uplink forwarding line card. Correspondingly, when receiving the packet from the backboard, the programmable chip may identify the type of the uplink forwarding line card, based on the SMOD carried by the inter-board forwarding header.

In block 715, when the programmable chip of the programmable line card identifies that the packet comes from the uplink switch line card, the programmable chip may respectively search for the corresponding adjacency table entry and the corresponding egress interface entry in the adjacency table and egress interface table of the programmable chip, based on the adjacency table index and the egress interface index carried by the pseudo-Layer 2 header of the packet.

In block 716, the programmable chip may re-encapsulate a Layer 2 header of a corresponding interface type for the packet, the inter-board forwarding header and the pseudo-Layer 2 header of which have been removed, based on the adjacency table entry and the egress interface entry searched out, and transmit the encapsulated packet through a corresponding external interface of the programmable line card.

Until now, an interoperation process between the uplink switch line card and the downlink programmable line card is completed.

In addition, it should be noted that, when the switch chip of the switch line card does not search out the corresponding FIB entry in block 711, the switch chip may not execute blocks 712-716. Instead, the switch chip may submit the packet to the CPU of the switch line card. When the corresponding FIB entry exists in the CPU of the switch line card, the CPU of the switch line card may process the packet, and forward the packet to the CPU of the downlink forwarding line card through the backboard. When the corresponding FIB entry does not exist in the CPU of the switch line card, discard the packet.

When the programmable chip of the downlink programmable line card receives the packet from the backboard, and identifies that the packet comes from the uplink programmable line card in block 714, the programmable chip of the programmable line card may not execute blocks 715-716. Instead, the programmable chip of the programmable line card may obtain the adjacency table index and the egress interface index from the packet control block of the packet as in the prior art, search for the corresponding adjacency table entry and the corresponding egress interface entry in the downlink programmable line card, based on the adjacency table index and the egress interface index obtained from the packet control block, encapsulate the Ethernet Layer 2 header based on the adjacency table entry and the egress interface entry searched out in the downlink programmable line card, and then transmit the encapsulated packet through a corresponding external interface of the downlink programmable line card.

As shown in FIG. 6*b*, the following blocks may further be included in the method for interoperating between an uplink programmable line card and a downlink switch line card.

In block 721, when a programmable chip of a programmable line card receives a packet through an external interface of the programmable line card, the programmable chip may search for a corresponding FIB entry in a FIB table of the programmable chip.

In block 722, when the programmable chip of the programmable line card searches out the corresponding FIB entry, the programmable chip may identify the type of the downlink forwarding line card based on the corresponding FIB entry.

For example, when searching out the corresponding FIB entry, the programmable chip may search for the module number of the slot located by the downlink forwarding line card, based on the FIB entry, and identify the type of the downlink forwarding line card, based on a corresponding relationship between a module number and a line card type configured in advance by the CPU of the programmable line card. Correspondingly, the inter-board forwarding header encapsulated by the programmable chip of the uplink programmable line card may carry the module number of the slot located by the downlink forwarding line card.

In block 723, when the programmable chip of the programmable line card identifies that the downlink forwarding line card is the switch line card, the programmable chip may respectively search for the corresponding adjacency table entry and the corresponding egress interface entry in the adjacency table and egress interface table of the programmable chip, based on the corresponding FIB entry.

In block 724, the programmable chip may encapsulate the inter-board forwarding header and an Ethernet Layer 2 header for the packet, based on the adjacency table entry and the egress interface entry searched out, and forward the encapsulated packet to the downlink forwarding line card through the backboard.

In block 725, when the switch chip of the switch line card receives the packet through the backboard, the switch chip may remove the inter-board forwarding header of the packet, and transmit the packet with the Ethernet Layer 2 header through a corresponding external interface of the switch line card.

Until now, an interoperation process between the uplink programmable line card and the downlink switch line card is completed.

In addition, it should be noted that, when the programmable chip of the programmable line card does not search out the corresponding FIB entry in block 721, the programmable chip may submit the packet to the CPU of the programmable line card. When the corresponding FIB entry exists in the CPU of the programmable line card, the CPU of the programmable line card may process the packet, and forward the packet to the CPU of the downlink forwarding line card through the backboard. When the corresponding FIB entry does not exist in the CPU of the programmable line card, discard the packet.

Figure 7A:
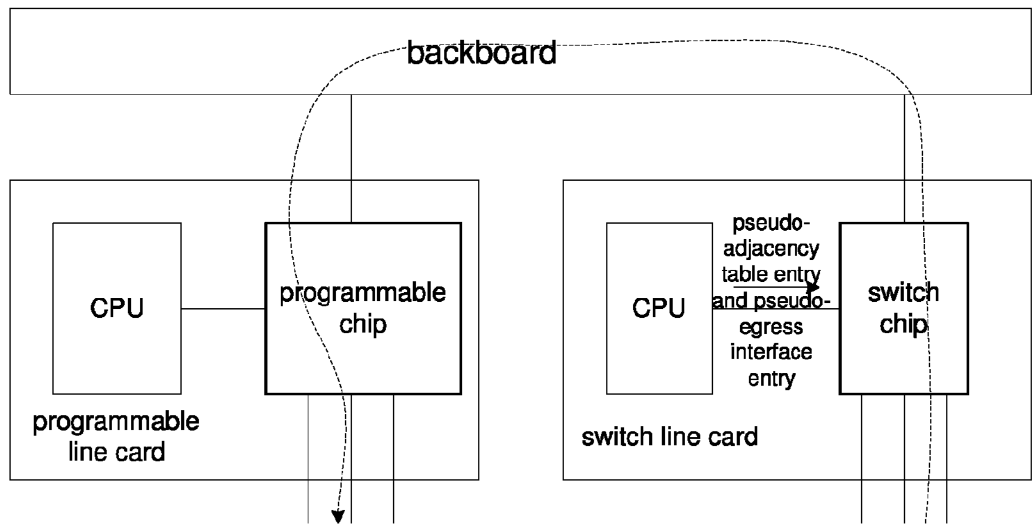
FIG. 7*a* and FIG. 7*b* are respectively a schematic diagram illustrating a structure of a packet forwarding device, in accordance with an example of the present disclosure.
Figure 7B:
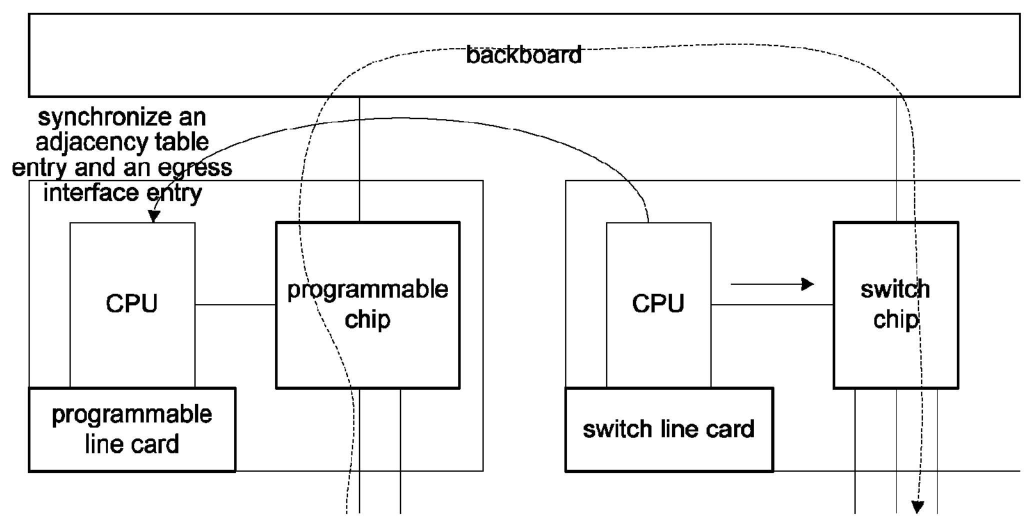

Detailed descriptions about interoperation between switch line card and programmable line card in the example are provided with the foregoing contents. In addition to the foregoing method, an example of the present disclosure also provides a packet forwarding device. With reference to FIG. 7*a* and FIG. 7*b*, the packet forwarding device may include a backboard, and a forwarding line card plugged in the backboard. The forwarding line card may include a switch line card with a switch chip and a programmable line card with a programmable chip.

First of all, please refer to FIG. 7*a*. The switch line card may possess a switch chip, which is configured to search for a corresponding FIB entry in a FIB table of the switch chip, when receiving a packet through an external interface of the switch line card. When searching out the corresponding FIB entry, the switch chip may respectively search for a corresponding adjacency table entry and a corresponding egress interface entry in an adjacency table and an egress interface table of the switch chip, based on the corresponding FIB entry. When the downlink forwarding line card is the programmable line card, the adjacency table entry and egress interface entry searched out by the switch chip of the switch line card are respectively a pseudo-adjacency table entry and a pseudo-egress interface entry. The pseudo-adjacency table entry may include the adjacency table index and the egress interface index, which are needed by the downlink programmable line card. The pseudo-egress interface entry may include a universal VLAN ID and a universal source MAC (e.g., the VLAN ID and source MAC of the reserved VLAN resources), which are dedicated for the switch line card to forward a packet to the programmable line card. When searching out the corresponding adjacency table entry and the corresponding egress interface entry, the switch chip may encapsulate the inter-board forwarding header and the Ethernet Layer 2 header for the packet, based on the adjacency table entry and the egress interface entry searched out, and forward the encapsulated packet to the downlink forwarding line card through the backboard. When the downlink forwarding line card is the programmable line card, the Ethernet Layer 2 header encapsulated for the packet based on the pseudo-adjacency table entry and the pseudo-egress interface entry is a pseudo-Layer 2 header, which carries the adjacency table index and the egress interface index needed by the downlink programmable line card, as well as carries the universal VLAN ID and the universal source MAC.

The pseudo-adjacency table entry may include the adjacency table index and the egress interface index needed by the downlink programmable line card, which are encapsulated into the destination MAC field of the pseudo-Layer 2 header. The pseudo-egress interface entry may include the universal VLAN ID and the universal source MAC dedicated for the switch line card to forward a packet to the programmable line card, which are respectively encapsulated into the VLAN ID field and the source MAC field of the pseudo-Layer 2 header.

When receiving the packet through the backboard, the programmable chip of the programmable line card is configured to identify the type of the uplink forwarding line card, based on the inter-board forwarding header of the packet, and remove the inter-board forwarding header of the packet. When identifying that the packet comes from the uplink switch line card, the programmable chip may respectively search for the corresponding adjacency table entry and the corresponding egress interface entry in the adjacency table and egress interface table of the programmable chip, based on the adjacency table index and the egress interface index carried by the pseudo-Layer 2 header of the packet, and remove the pseudo-Layer 2 header of the packet. The programmable chip may re-encapsulate a Layer 2 header of a corresponding interface type for the packet, the inter-board forwarding header and the pseudo-Layer 2 header of which have been removed, based on the adjacency table entry and the egress interface entry searched out, and transmit the encapsulated packet through a corresponding external interface of the programmable line card.

The inter-board forwarding header may carry a SMOD indicating the slot located by the uplink forwarding line card. When receiving the packet through the backboard, the programmable chip may identify the type of the uplink forwarding line card, based on the SMOD carried by the inter-board forwarding header.

When the corresponding FIB entry is not searched out, the switch chip of the switch line card may further submit the packet to the CPU of the switch line card. When the corresponding FIB entry exists in the CPU of the switch line card, the CPU of the switch line card may process the packet, and forward the packet to the CPU of the downlink forwarding line card through the backboard. When the corresponding FIB entry does not exist in the CPU of the switch line card, discard the packet.

And then, please refer to FIG. 7*b*. When receiving a packet through an external interface of the programmable line card, the programmable chip of the programmable line card is further configured to search for the corresponding FIB entry in the FIB table of the programmable chip. When searching out the corresponding FIB entry, the programmable chip may identify the type of the downlink forwarding line card, based on the corresponding FIB entry. When identifying that the downlink forwarding line card is the switch line card, the programmable chip may respectively search for the corresponding adjacency table entry and the corresponding egress interface entry in the adjacency table and egress interface table of the programmable chip, based on the corresponding FIB entry. When searching out the corresponding adjacency table entry and the corresponding egress interface entry, the programmable chip may encapsulate the inter-board forwarding header and the Ethernet Layer 2 header for the packet, based on the adjacency table entry and the egress interface entry searched out, and then forward the encapsulated packet to the downlink forwarding line card through the backboard.

When searching out the corresponding FIB entry, the programmable chip may search for the module number of the slot located by the downlink forwarding line card, based on the FIB entry, and identify the type of the downlink forwarding line card, based on the corresponding relationship between the module number and line card type, which is configured in advance by the CPU of the programmable line card. The inter-board forwarding header may carry the module number of the slot located by the downlink forwarding line card.

When receiving the packet through the backboard, the switch chip of the switch line card may further remove the inter-board forwarding header of the packet, and transmit the packet with the Ethernet Layer 2 header through a corresponding external interface of the switch line card.

In addition, when the corresponding FIB entry is not searched out, the programmable chip of the programmable line card may submit the packet to the CPU of the programmable line card. When the corresponding FIB entry exists in the CPU of the programmable line card, the CPU of the programmable line card may process the packet, and forward the packet to the CPU of the downlink forwarding line card through the backboard. When the corresponding FIB entry does not exist in the CPU of the programmable line card, discard the packet.

The foregoing is examples of the present disclosure, which is not used for limiting the present disclosure. Any modifications, equivalent substitutions and improvements made within the spirit and principle of the present disclosure, should be covered by the protection scope of the present disclosure.

The invention claimed is:

1. A method for interoperating between a switch line card and a programmable line card, comprising:

receiving a packet through an external interface of the switch line card, when a corresponding forward information base (FIB) entry is searched out in a FIB table of a switch chip of the switch line card, searching for, by the switch chip, an adjacency table entry and an egress interface entry, which are respectively a pseudo-adjacency table entry and a pseudo-egress interface entry when a downlink forwarding line card is a programmable line card;

encapsulating, by the switch chip, an inter-board forwarding header and an Ethernet Layer 2 header for the packet, based on the adjacency table entry and the egress interface entry searched out, and forwarding the packet encapsulated to the downlink forwarding line card through a backboard, wherein the Ethernet Layer 2 header is a pseudo-Layer 2 header when the downlink forwarding line card is the programmable line card;

identifying, by a programmable chip of the programmable line card the packet comes from an uplink switch line card, searching for a corresponding adjacency table entry and a corresponding egress interface entry;

re-encapsulating, by the programmable chip, a Layer 2 header of a corresponding interface type for the packet, and transmitting the packet encapsulated through a corresponding external interface of the programmable line card.

2. The method according to claim 1, wherein the pseudo-adjacency table entry comprises an adjacency table index and an egress interface index, which are for use by a downlink programmable line card, the pseudo-egress interface entry comprises a universal virtual local area network (VLAN) identifier (ID) and a universal source media access control (MAC), which are dedicated for the switch line card to forward a packet to the programmable line card.

3. The method according to claim 2, wherein the pseudo-Layer 2 header carries the adjacency table index and the egress interface index needed by the downlink programmable line card, as well as carries the universal VLAN ID and the universal source MAC, and the method further comprises:

when receiving the packet through the backboard, identifying, by the programmable chip of the programmable line card, a type of an uplink forwarding line card, based on the inter-board forwarding header of the packet, and removing the inter-board forwarding header of the packet.

4. The method according to claim 3, wherein searching for the corresponding adjacency table entry and the corresponding egress interface entry comprises:

searching for, by the programmable chip of the programmable line card, the corresponding adjacency table entry and the corresponding egress interface entry in an adjacency table and an egress interface table of the programmable chip, based on the adjacency table index and the egress interface index carried by the pseudo-Layer 2 header of the packet.

5. The method according to claim 3, wherein the adjacency table index and the egress interface index needed by the downlink programmable line card in the pseudo-adjacency table entry are encapsulated into a destination MAC field of the pseudo-Layer 2 header, the pseudo-egress interface entry comprises the universal VLAN ID and the universal source MAC dedicated for the switch line card to forward the packet to the programmable line card, which are respectively encapsulated into a VLAN ID field and a source MAC field of the pseudo-Layer 2 header.

6. The method according to claim 5, wherein the universal VLAN ID and the universal source MAC dedicated for the switch line card to forward the packet to the programmable line card are respectively a VLAN ID and a source MAC in reserved VLAN resources.

7. The method according to claim 1, further comprising:

when the corresponding FIB entry is not searched out, submitting, by the switch chip of the switch line card, the packet to a central processing unit (CPU) of the switch line card;

when the corresponding FIB entry exists in the CPU of the switch line card, processing, by the CPU of the switch line card, the packet, and forwarding the packet to the CPU of the downlink forwarding line card through the backboard;

when the corresponding FIB entry does not exist in the CPU of the switch line card, discarding the packet.

8. The method according to claim 1, further comprising:

receiving the packet through an external interface of the programmable line card, when searching out a corresponding FIB entry in a FIB table of the programmable chip, and identifying the downlink forwarding line card is the switch line card, searching for, by the programmable chip of the programmable line card, a corresponding adjacency table entry and a corresponding egress interface entry;

encapsulating, by the programmable chip, an inter-board forwarding header and an Ethernet Layer 2 header for the packet, based on the adjacency table entry and the egress interface entry searched out, and forwarding the packet encapsulated to the downlink forwarding line card through the backboard;

when receiving the packet through the backboard, removing, by the switch chip of the switch line card, the inter-board forwarding header of the packet, and transmitting the packet with the Ethernet Layer 2 header through the corresponding external interface of the switch line card.

9. The method according to claim 8, further comprising:

when searching out the corresponding FIB entry, searching for, by the programmable chip, a module number of a slot located by the downlink forwarding line card based on the FIB entry, identifying the type of the downlink forwarding line card, based on a corresponding relationship between a module number and a line card type configured in advance by the CPU of the programmable line card, wherein the inter-board forwarding header carries the module number of the slot located by the downlink forwarding line card.

10. The method according to claim 8, further comprising:

when the corresponding FIB entry is not searched out, submitting, by the programmable chip of the programmable line card, the packet to the CPU of the programmable line card;

when the corresponding FIB entry exists in the CPU of the programmable line card, processing, by the CPU of the programmable line card, the packet, and forwarding the packet to the CPU of the downlink forwarding line card through the backboard;

when the corresponding FIB entry does not exist in the CPU of the programmable line card, discarding the packet.

11. A network device comprising a backboard and a forwarding line card connected to the backboard, wherein the forwarding line card comprises a switch line card and a programmable line card;

the switch line card including a switch chip, when receiving a packet through an external interface of the switch line card and a corresponding forward information base (FIB) entry is searched out in a FIB table of the switch chip, the switch chip is to search for a corresponding adjacency table entry and a corresponding egress interface entry, which are respectively a pseudo-adjacency table entry and a pseudo-egress interface entry, when a downlink forwarding line card is the programmable line card;

the switch chip is further to encapsulate an inter-board forwarding header and an Ethernet Layer 2 header for the packet, based on the adjacency table entry and the egress interface entry searched out, and forward the packet encapsulated to the downlink forwarding line card through the backboard, wherein the Ethernet Layer 2 header is a pseudo-Layer 2 header, when the downlink forwarding line card is the programmable line card;

when identifying that the packet comes from an uplink switch line card, a programmable chip of the programmable line card is to respectively search for a corresponding adjacency table entry and a corresponding egress interface entry, re-encapsulate a Layer 2 header of a corresponding interface type for the packet, and transmit the packet encapsulated through a corresponding external interface of the programmable line card.

12. The device according to claim 11, wherein the pseudo-adjacency table entry comprises an adjacency table index and an egress interface index for use by a downlink programmable line card, the pseudo-egress interface entry comprises a universal virtual local area network (VLAN) identifier (ID) and a universal source media access control (MAC) dedicated for the switch line card to forward a packet to the programmable line card.

13. The device according to claim 12, wherein the pseudo-Layer 2 header carries the adjacency table index and the egress interface index needed by the downlink programmable line card, as well as carries the universal VLAN ID and the universal source MAC;

when receiving the packet through the backboard, the programmable chip of the programmable line card is further to identify a type of an uplink forwarding line card, based on the inter-board forwarding header of the packet, and remove the inter-board forwarding header of the packet.

14. The device according to 13, wherein the programmable chip of the programmable line card is further to search for the corresponding adjacency table entry and the corresponding egress interface entry in an adjacency table and an egress interface table of the programmable chip, based on the adjacency table index and the egress interface index carried by the pseudo-Layer 2 header of the packet.

15. The device according to claim 13, wherein the adjacency table index and the egress interface index needed by the downlink programmable line card in the pseudo-adjacency table entry are encapsulated into a destination MAC field of the pseudo-Layer 2 header, the pseudo-egress interface entry comprises the universal VLAN ID and the universal source MAC dedicated for the switch line card to forward a packet to the programmable line card, which are respectively encapsulated into a VLAN ID field and a source MAC field of the pseudo-Layer 2 header.

16. The device according to claim 15, wherein the universal VLAN ID and the universal source MAC dedicated for the switch line card to forward the packet to the programmable line card are respectively a VLAN ID and a source MAC in reserved VLAN resources.

17. The device according to claim 11, wherein the switch chip of the switch line card is further to submit the packet to the CPU of the switch line card, when the corresponding FIB entry is not searched out;

when the corresponding FIB entry exists in the CPU of the switch line card, the CPU of the switch line card is further to process the packet, and forward the packet to the CPU of the downlink forwarding line card through the backboard;

when the corresponding FIB entry does not exist in the CPU of the switch line card, the CPU of the switch line card is further to discard the packet.

18. The device according to claim 11, wherein when receiving the packet through an external interface of the programmable line card and a corresponding FIB entry is searched out, and identifying that the downlink forwarding line card is the switch line card, the programmable chip of the programmable line card is further to respectively search for a corresponding adjacency table entry and a corresponding egress interface entry, based on the corresponding FIB entry, encapsulate an inter-board forwarding header and an Ethernet Layer 2 header for the packet, and forward the packet encapsulated to the downlink forwarding line card through the backboard;

when receiving the packet through the backboard, the switch chip of the switch line card is further to remove the inter-board forwarding header of the packet, and transmit the packet with the Ethernet Layer 2 header through a corresponding external interface of the switch line card.

19. The device according to claim 18, wherein when searching out the corresponding FIB entry, the programmable chip is further to search for a module number of a slot located by the downlink forwarding line card based on the FIB entry, identify the type of the downlink forwarding line card, based on a corresponding relationship between a module number and a line card type configured in advance by the CPU of the programmable line card, wherein the inter-board forwarding header carries the module number of the slot located by the downlink forwarding line card.

20. The device according to claim 19, wherein the programmable chip of the programmable line card is further to submit the packet to the CPU of the programmable line card, when the corresponding FIB entry is not searched out;

when the corresponding FIB entry exists in the CPU of the programmable line card, the CPU of the programmable line card is to process the packet, and forward the packet to the CPU of the downlink forwarding line card through the backboard;

when the corresponding FIB entry does not exist in the CPU of the programmable line card, the CPU of the programmable line card is further to discard the packet.

* * * * *